July 19, 1938.  G. T. GOURLEY  2,124,465

CASTER RETAINER

Filed Aug. 18, 1937

Inventor
*Glenn T. Gourley,*
By
Attorney

Patented July 19, 1938

2,124,465

UNITED STATES PATENT OFFICE 2,124,465

CASTER RETAINER

Glenn Theodore Gourley, Youngstown, Ohio, assignor to The General Fireproofing Company, Youngstown, Ohio, a corporation of Ohio Application August 18, 1937, Serial No. 159,794

2 Claims. (Cl. 16—43)

This invention relates to caster retainers for metal furniture, and more particularly to a novel unit for mounting a caster socket in the hollow leg of a chair base or other article of furniture.

While various structures have heretofore been used for mounting casters in the legs of metal furniture, nevertheless, since the entire weight of the piece of furniture itself, as well as its supported load, is focused or concentrated at the caster locations, it frequently results that either the caster socket or its support become loose. This not only makes the entire article of furniture unsteady, but also ultimately tears the caster retaining structure away from the furniture leg. According to one form of prior practice, it is customary to drive the caster socket proper into a plate or other support which is first welded to the furniture base. However, in driving the socket in place the welds are frequently broken or ruptured, or, on the other hand, if the welds hold under the force of driving the socket in place, the socket itself, when in use, soon works or wears loose in its support and consequently the caster shank cants or tilts and thus renders the entire article of furniture unsafe or unsatisfactory in use.

Therefore, the present invention contemplates a structure which may be prefabricated as an integral unit and which requires no force to effect its application thereby avoiding the necessity of placing any of the parts under stress or strain and which in turn, becomes in effect an integral part of the leg, so that the caster is always adequately supported with consequent stability to the entire article of furniture. That is to say, the present invention provides a caster socket which is molded in a casting and this casting is then welded to the furniture leg, so that as far as ultimate rigidity and stability is concerned, the caster socket is in effect an integral part of the furniture leg.

With the above and other objects in view which will more readily appear as the nature of the invention is better understood, the same consists in the novel construction, combination, and arrangement of parts, hereinafter more fully illustrated and claimed.

A preferred and practical embodiment of the invention is shown in the accompanying drawing in which.

Figure 1:
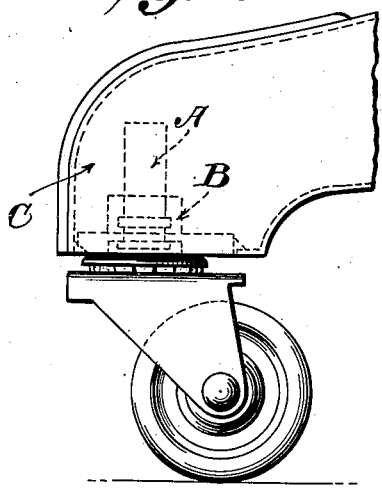
Figure 1 is a detail view showing the application of the invention.

According to the embodiment of the invention shown in the accompanying drawing, it will be observed that the invention includes in its organization a caster socket A and a support or base B therefor, which, together, provide a one piece unit which may be welded as indicated at W to and within the hollow leg C of the furniture base.

The caster socket A is preferably in the form of a tubular member made from seamless, cold rolled steel. In practice the socket A is a screw machine product. The outer surface of the socket A is provided with an offset rib or flange 1 which is intended to serve as a key to securely hold the socket in the casting B when the latter is molded thereabout. The flange or rib 1 may be knurled or otherwise suitably formed as indicated at 2 to prevent the turning of the socket in the casting after the unit is made.

The lower end or mouth of the socket A is preferably formed with a lip or bead 3 and the inner surface of said lip of bead is preferably beveled or chamfered as indicated at 4 to facilitate entrance of the caster shank into the socket.

The support or base B of the unit is molded about the socket A by any suitable molding operation and is formed with an upstanding collar portion 5 which embraces a portion of the external surface of the socket and also has the key rib, or flange 1 embedded therein. The body of the casting B designated generally as 6 is preferably relatively flat and of suitable shape to fit into the open end of a hollow metal furniture leg. In the illustration shown, the body 6 is preferably of elongated formation to fit relatively close into the hollow leg of a swivel chair base. The central portion of the base or body 6 of the casting is preferably recessed as indicated at 7 so that the bead 3 is countersunk in the casting thereby permitting the ball bearing housing of the caster to rest firmly against the underside of the base when the caster is installed.

Figure 2:
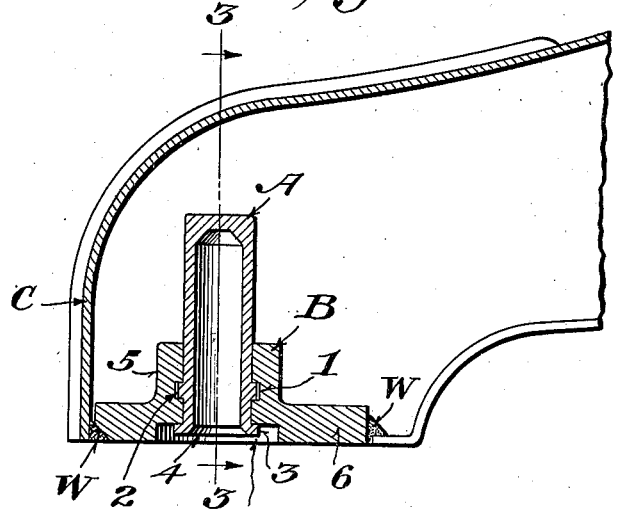
Figure 2 is a vertical sectional view taken on the line 2—2 of Figure 4.
Figure 3:
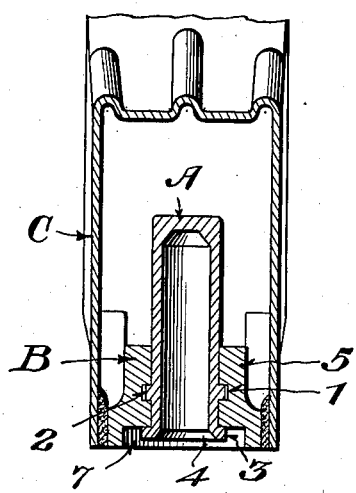
Figure 3 is a vertical sectional view taken on the line 3—3 of Figure 2.
Figure 4:
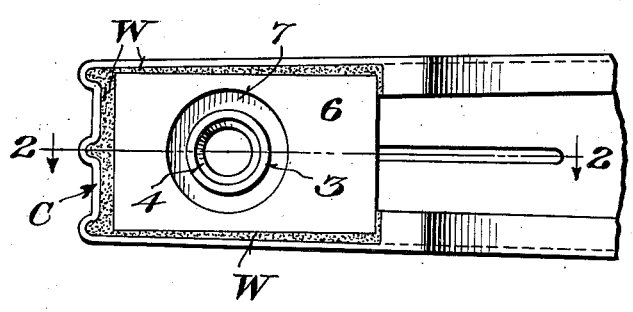
Figure 4 is a bottom plan view of the construction shown in Figures 2 and 3.
Figure 5:
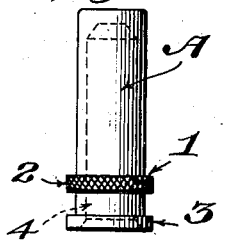
Figure 5 is a detail view of the caster socket.

The base 6 is welded to the leg by the weld W as previously indicated, the said weld extending along four sides of the chair leg and firmly uniting the side edges of the base with said leg, as will be apparent from Figures 2, 3 and 4.

The present caster retainer unit is particularly adaptable to aluminum furniture and has solved one of the perplexing problems incident to providing furniture of this type with a permanently stable caster retainer. As previously indicated, the socket is made of cold rolled steel so as to combine maximum strength with wear resisting qualities while the base B is cast aluminum, thereby permitting of welding of aluminum to aluminum since the leg of the chair is also aluminum.

From the foregoing it will be apparent that the structural characteristics of the retainer unit will provide maximum rigidity and stability while maintaining the necessary lightness of the unit which is a factor to be considered in aluminum furniture. In practice, it has been found that the present unit not only facilitates the manufacture of articles of furniture requiring casters, but, also, the structure involved strands up under extraordinarily hard wear and even abuse where previous structures have failed.

Accordingly, without further description it is thought that the features and advantages of the invention will be readily apparent to those skilled in the art and it will, of course, be understood that changes may be resorted to within the scope of the appended claims.

I claim:

1. As an article of manufacture, a caster retainer unit including a tubular socket having external key means on the outer wall thereof and also having a peripheral bead at one end, and a casting molded about a portion of said socket and including a body portion and an upstanding collar having said key means of the socket embedded therein.

2. As an article of manufacture for use in hollow metal furniture legs, a caster retainer unit comprising a pre-formed tubular caster socket having external key means on an outer wall thereof and a peripheral bead at its open end, and a supporting and attaching member comprising a body of metal molded to said key means on the outer wall of the caster socket and above the bead thereon to rigidly mount the said pre-formed socket therein, said body extending radially from the axis of the socket to provide a rigid web for sustaining and distributing the load imposed on the socket when the body is inserted in a hollow metal furniture leg and the marginal edges thereof are welded thereto.

GLENN THEODORE GOURLEY.